(12) United States Patent
Jalloul et al.

(10) Patent No.: US 9,210,716 B2
(45) Date of Patent: *Dec. 8, 2015

(54) METHOD AND APPARATUS FOR MANAGING UPLINK COMMUNICATION IN WIRELESS COMMUNICATION NETWORK

(71) Applicant: Broadcom Corporation, Irvine, CA (US)

(72) Inventors: Louay Jalloul, San Jose, CA (US); Sriram Mudulodu, Santa Clara, CA (US); Sam P. Alex, Sunnyvale, CA (US); Leena Zacharias, San Jose, CA (US); Bertrand Hochwald, Santa Clara, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,971

(22) Filed: Mar. 26, 2015

(65) Prior Publication Data

US 2015/0201423 A1 Jul. 16, 2015

Related U.S. Application Data

(63) Continuation of application No. 12/459,912, filed on Jul. 9, 2009, now Pat. No. 9,026,123.

(60) Provisional application No. 61/134,323, filed on Jul. 9, 2008.

(51) Int. Cl.
*H04W 72/00* (2009.01)
*H04W 72/08* (2009.01)
(Continued)

(52) U.S. Cl.
CPC ........... *H04W 72/085* (2013.01); *H04L 1/0003* (2013.01); *H04L 1/0015* (2013.01); *H04L 1/0009* (2013.01); *H04L 1/0021* (2013.01); *H04W 24/00* (2013.01); *H04W 28/18* (2013.01)

(58) Field of Classification Search
CPC ..... H04L 1/0003; H04L 1/009; H04L 1/0071; H04L 1/0059; H04L 1/08; H04L 1/0015; H04L 1/0026; H04L 27/2608; H04L 1/0045; H04L 5/023; H04L 1/0025; H04L 25/03019; H04L 27/2096; H04L 5/0037; H04L 1/04; H04B 7/264; H04B 1/707; H04B 10/40; H04B 1/7097; H04B 1/7107; H04B 7/0408; H04B 17/24
IPC ............. H04L 1/0003, 1/0009, 1/0071, 1/0059, H04L 1/08, 1/0015, 1/0026, 27/2608, 1/0045, H04L 5/023, 1/0025, 25/03019, 27/2096, H04L 5/0037, 1/04; H04B 7/264, 1/707, H04B 10/40, 1/7097, 1/7107, 7/0408, 17/24
See application file for complete search history.

(56) References Cited

U.S. PATENT DOCUMENTS

7,218,946 B2 5/2007 Chang et al.
7,277,492 B2 10/2007 Itoh
(Continued)

*Primary Examiner* — Golam Sorowar
(74) *Attorney, Agent, or Firm* — Sterne, Kessler, Goldstein & Fox P.L.L.C.

(57) ABSTRACT

A method for managing uplink communication in a wireless communication network is provided. The method includes selecting one or more Mobile Stations (MSs) from a plurality of MSs based on a first signal parameter corresponding to each MS of the one or more MSs, one or more second signal parameters corresponding to each MS of the one or more MSs, and one or more threshold parameters. The first signal parameter is associated with a Base Station (BS) serving a MS. Further, the one or more second signal parameters are associated with one or more BSs neighboring to the MS. The one or more threshold parameters are associated with a communication parameter. Thereafter, the method includes modifying an uplink Modulation and Coding Scheme (MCS) level of the one or more MSs.

20 Claims, 7 Drawing Sheets

(51) Int. Cl.
*H04L 1/00* (2006.01)
*H04W 24/00* (2009.01)
*H04W 28/18* (2009.01)

(56) References Cited

U.S. PATENT DOCUMENTS

| | | |
|---|---|---|
| 7,433,337 B2 | 10/2008 | Chao et al. |
| 2003/0003906 A1* | 1/2003 | Demers et al. ............... 455/424 |
| 2004/0166900 A1* | 8/2004 | Qiu et al. ..................... 455/560 |
| 2005/0099973 A1* | 5/2005 | Qiu et al. ..................... 370/328 |
| 2005/0107090 A1 | 5/2005 | Hosein |
| 2005/0201270 A1 | 9/2005 | Song et al. |
| 2007/0087772 A1* | 4/2007 | Yi et al. ....................... 455/522 |
| 2007/0141995 A1* | 6/2007 | Youn et al. .................... 455/69 |
| 2007/0280170 A1 | 12/2007 | Kawasaki |
| 2008/0188235 A1* | 8/2008 | Kim et al. .................... 455/453 |
| 2008/0232322 A1 | 9/2008 | Heo et al. |
| 2010/0009689 A1 | 1/2010 | Jalloul et al. |

* cited by examiner

METHOD AND APPARATUS FOR MANAGING UPLINK COMMUNICATION IN WIRELESS COMMUNICATION NETWORK

CROSS REFERENCE TO RELATED APPLICATIONS

This application is a continuation of U.S. patent application Ser. No. 12/459,912, filed on Jul. 9, 2009, entitled Method and Apparatus for Managing Uplink Communication in Wireless Communication Network, which is incorporated herein by reference in its entirety. The Ser. No. 12/459,912 application claims benefit of U.S. Provisional Patent Application No. 61/134,323, filed on Jul. 9, 2008, entitled Method and System for Uplink Interference Reduction in a Wireless Communication System, which is incorporated herein by reference in its entirety.

FIELD OF THE INVENTION

The present invention relates generally to wireless communication networks. More specifically, the invention relates to a method and apparatus for managing modulation and coding scheme level based on uplink interference in wireless communication network.

BACKGROUND OF THE INVENTION

In a wireless communication network, a high network throughput is required for establishing a good communication link between one or more Base Stations (BS) and one or more Mobile Stations (MS). As network throughput is inversely proportional to interference, lowering the interference results in increased network throughput. The uplink interference is usually reduced by performing a link adaptation at the uplink. The link adaptation is performed by changing a modulation and coding scheme (MCS) level associated with the uplink. Such a link adaptation results in higher uplink throughput.

Generally, the link adaptation involves selection of an appropriate MCS level based on quality of the uplink between a BS and a MS. The quality of uplink includes uplink interference and fading characteristics of the uplink. For improving the quality of the uplink, a higher MCS scheme is selected. As a result, there is an increase in transmission power required by the MS for transmitting the signal through the uplink. Hence, overall uplink interference may increase in the wireless communication network, as the signal is transmitted with high transmission power.

Link adaptation may also be performed by controlling power utilization of the MS. Generally, an Open Loop Power Control mechanism may be utilized for controlling the power. Controlling the power involves reducing transmission power required by MS for transmitting the signal through the uplink. This may lead to reduction of the overall uplink interference in the wireless communication network. However, reduction of the transmission power may affect the quality of the signal transmitted as the MCS level is lowered accordingly. Hence, a tradeoff between controlling the power utilization of the MS and lowering the MCS level is required to enable transmission of signals with good quality and low uplink interference at the same time.

There are existing methods for maintaining the tradeoff between controlling the transmitted power associated with the MS and lowering the MCS level. One of these methods involves identifying a permissible uplink interference in the wireless communication network and lowering the MCS level of all MSs in the wireless communication network by a fixed MCS level. However, this method does not consider criteria for the permissible uplink interference generated by individual MSs. Thus, an optimum MCS level may not be achieved for all the MSs in the wireless communication network.

Therefore, there is a need for a method and apparatus for modifying uplink MCS level of MSs in a wireless communication network by considering criteria for the uplink interference generated by the MSs in the wireless communication network.

BRIEF DESCRIPTION OF DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE DRAWINGS

Before describing in detail embodiments that are in accordance with the invention, it should be observed that the embodiments reside primarily in combinations of method steps and apparatus components related to a method and apparatus for managing uplink communication in a wireless communication network. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments described herein may be comprised of one or more conventional processors and unique stored program instructions that control the one or more processors to implement, in conjunction with certain non-processor circuits, some, most, or all of the functions of method and apparatus for communication in a wireless communication system. The non-processor circuits may include, but are not limited to, a radio receiver, a radio transmitter, signal drivers, clock circuits, power source circuits, and user input devices.

Various embodiments of the invention provide method and apparatus for managing uplink communication in a wireless communication network. The method includes selecting one or more Mobile Stations (MSs) from a plurality of MSs based on a first signal parameter corresponding to the one or more MSs, one or more second signal parameters corresponding to the one or more MSs, and one or more threshold parameters. The first signal parameter is associated with a Base Station (BS) serving a MS. A second signal parameter of the one or more second signal parameters is associated with one or more BSs neighboring to a MS that are not serving the MS. The method further includes modifying Modulation and Coding Scheme (MCS) level of the one or more MSs.

Figure 1:
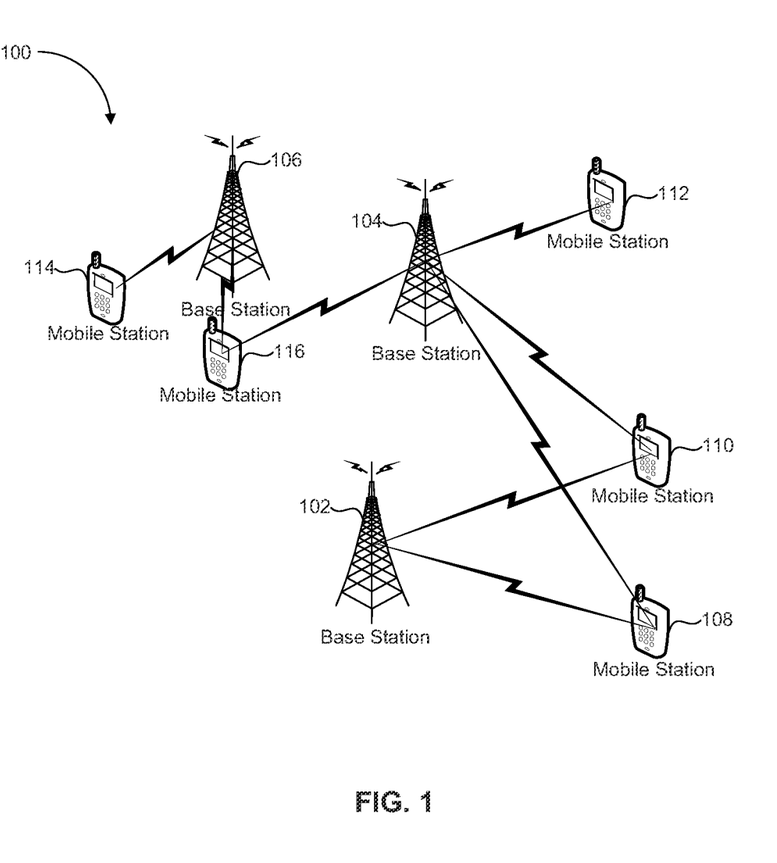
FIG. 1 illustrates a block diagram showing a wireless communication network in which various embodiments of the invention can function.

FIG. 1 illustrates a wireless communication network 100 in which various embodiments of the invention can function. Examples of wireless communication network 100 may include, but are not limited to, a Worldwide Interoperability for Microwave Access (WiMAX) communication network, a 3rd Generation Partnership Project (3GPP) network including 3GPP Long Term Evolution (LTE) network, a 3rd Generation Partnership Project 2 (3GPP2) network including 3GPP2 Ultra Mobile Broadband (UMB) network, a Wireless Fidelity (WiFi) network, a Code Division Multiple Access (CDMA) network, an Orthogonal Frequency Division Multiple Access (OFDMA) communication network, a Time Division Duplex (TDD) communication network and a Frequency Division Duplex (FDD) communication network.

Wireless communication network 100 includes a plurality of Base Stations (BSs), such as, BS 102, BS 104, and BS 106. In an embodiment of the invention, wireless communication network 100 may be a cellular network. In the cellular network, each BS of the plurality of BSs may have a corresponding cell. The cell corresponding to the each BS of the plurality of BSs may be divided into a plurality of sectors. Further, the plurality of BSs communicate with a plurality of Mobile Stations (MS), such as, MS 108, MS 110, MS 112, MS 114, and MS 116 in wireless communication network 100. For example, in wireless communication network 100, BS 102 communicates with MS 108 and MS 110. Similarly, BS 104 communicates with MS 112, and BS 106 communicates with MS 114 and MS 116. Examples of a MS may include, but are not limited to a Personal Digital Assistant (PDA), a hand-held communication device, a laptop, and a personal computer. A BS communicates with a MS through a communication link. The communication link is one of a DownLink (DL) and an UpLink (UL). For example, BS 102 transmits data to MS 108 through a DL. Whereas, MS 108 transmits data to BS 102 through an UL.

In wireless communication network 100, a MS estimates strength of signals received through a DL from various BSs. Strength of the signals may be indicated by a received signal strength indicator (RSSI) value. A BS sending signals associated with a highest strength of the signals to the MS is identified as a serving BS for the MS. For example, BS 102 serves MS 108 and MS 110. However, apart from the serving BS, one or more BSs sending signals associated with a significant strength of the signals to the MS are identified as one or more BSs neighboring to the MS. The one or more BSs neighboring to the MS are located near to the MS in wireless communication network 100 and may have the capability to establish communication with the MS. For example, BS 104 is neighboring to MS 108. The one or more BSs neighboring to the MS correspond to an active set of BSs for the MS.

To identify the active set of BSs, strengths of signals corresponding to one or more BSs neighboring to the MS may be estimated by using various parameters. These parameters may include, but are not limited to, a preamble symbol strength, a pilot channel strength, a channel quality indicator, and a transmit power. Based on the strength of the signals estimated, the one or more BSs are identified as the active set of BSs. Thereafter, the MS may send the strength of signals associated with the active set of BSs as an active set report to the serving BS. The strength of the signals included in the active set report may be strength of the signals averaged over a frequency band. Also, the strength of the signals may be averaged over a time period. The active set report may be sent by the MS upon receiving a request from the serving BS.

Figure 2:
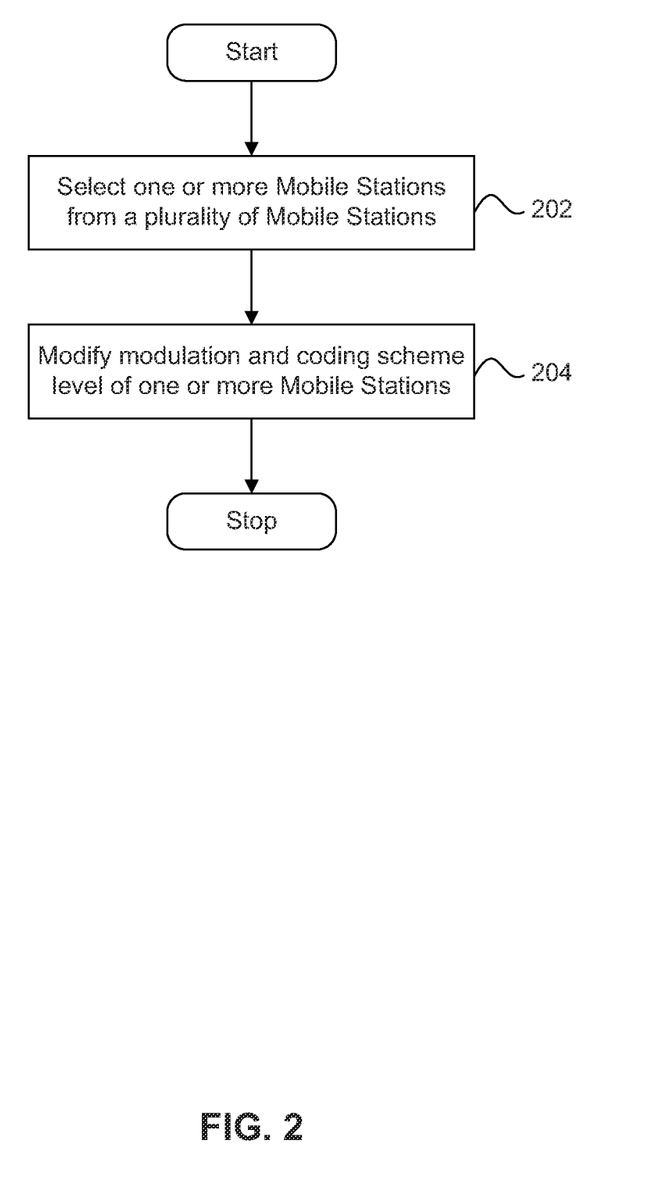
FIG. 2 is a flow chart illustrating a method for managing uplink communication in the wireless communication network, in accordance with an embodiment of the invention.

FIG. 2 is a flow chart illustrating a method for managing uplink communication in wireless communication network 100, in accordance with an embodiment of the invention. At step 202, one or more MSs are selected from a plurality of MSs based on a first signal parameter, one or more second signal parameters and one or more threshold parameters. A first signal parameter corresponding to each MS of the plurality of MSs in wireless communication network 100 is identified. A first signal parameter corresponding to a MS of the one or more MSs is associated with a serving BS corresponding to the MS. The first signal parameter may be a gain associated with a communication link between the MS and the serving BS. Alternatively, the first signal parameter may be a transmitted power corresponding to the serving BS. More specifically, the transmitted power is associated with a signal transmitted between the serving BS and the MS. Additionally, examples of the first signal parameter may include, but are not limited to a path loss, a shadowing parameter, an antenna gain, a fading parameter, a signal strength indicator, and a channel quality.

Apart from the first signal parameter, the one or more second signal parameters corresponding to each MS of the plurality of MSs are identified. One or more second signal parameters corresponding to a MS are associated with one or more BSs neighboring to the MS. The second signal parameter of the one or more second signal parameters may be a gain associated with a communication link between the MS and a BS of the one or more BSs neighboring to the MS. Additionally, examples of the one or more second signal parameters may include, but are not limited to a path loss, a shadowing parameter, an antenna gain, a fading parameter, a signal strength indicator, and a channel quality.

In various embodiments of the invention, a MS may send information corresponding to a first signal parameter and the one or more second signal parameters associated with the MS to the serving BS of the MS. Such information may be sent in response to a request from the serving BS. The MS may send the information via a message.

The first signal parameter and the one or more second signal parameters are combined and compared with the one or more threshold parameters. The method of combining the first signal parameter with the one or more second signal parameters is explained in detail in conjunction with FIG. 3 and FIG. 4. A threshold parameter of the one or more threshold parameters corresponds to a threshold for enabling efficient communication in wireless communication network 100. The one or more threshold parameters are associated with a communication parameter of wireless communication network 100. Examples of the communication parameter may include, but are not limited to a Carrier to Interference and Noise Ratio (CINR), a Physical CINR (PCINR), an Effective CINR (ECINR), a Carrier to Interference Ratio (CIR), a Signal to Interference and Noise Ratio (SINR), and a Signal to Interference Ratio (SIR), a coverage parameter, a Bit Error Rate (BER), a Block Error Rate (BLER), and an Outer Loop Correction (OLC) Factor.

Based on comparison of the first signal parameter and the one or more second signal parameters with the one or more threshold parameters, the one or more MSs are selected from the plurality of MSs in wireless communication network 100. The process of comparing the first signal parameter and the one or more second signal parameters with the one or more threshold parameters is explained in detail in conjunction with FIG. 3 and FIG. 4.

Thereafter, at step 204, Modulation and Coding Scheme (MCS) levels of the selected one or more MSs are modified. A MCS level of a MS of the one or more MSs is associated with an uplink of the MS. Modification of the MCS level may include selecting a new MCS level from a predefined set of MCS levels. Examples of a MCS level may include, but are not limited to ½ rate 4-Quadrature Amplitude Modulation (QAM), ¾ rate 4-QAM, ½ rate 16-QAM, ¾ rate 16-QAM and ½ rate 64-QAM. The predefined set of MCS levels may be defined by a network administrator. The predefined set of MCS levels is explained in detail in conjunction with FIG. 3. The MCS level is modified based on the communication parameter associated with a UL corresponding to the MS of the one or more MSs. The communication parameter may be a Signal to Interference Noise Ratio (SINR) value. The SINR value may be a physical SINR value or an Effective SINR value. The SINR value corresponding to the MS of the one or more MSs is a ratio of strength of a signal transmitted between the MS and the serving BS of the MS, to strength of a signal transmitted between another MS served by a BS neighboring to the MS and the serving BS of the MS. The serving BS may estimate the SINR value. The modification of MCS levels of the one or more MSs is further explained in detail in conjunction with FIG. 3.

In the above method, the one or more MSs selected from the plurality of MSs for MCS level modification may cause a maximum amount of interference in wireless communication network 100. By selecting the one or more MSs, a selective modification of MCS level is performed to reduce interference in wireless communication network 100. The selective modification of MCS level is performed taking into consideration intra cell interference and inter cell interference.

Figure 3:
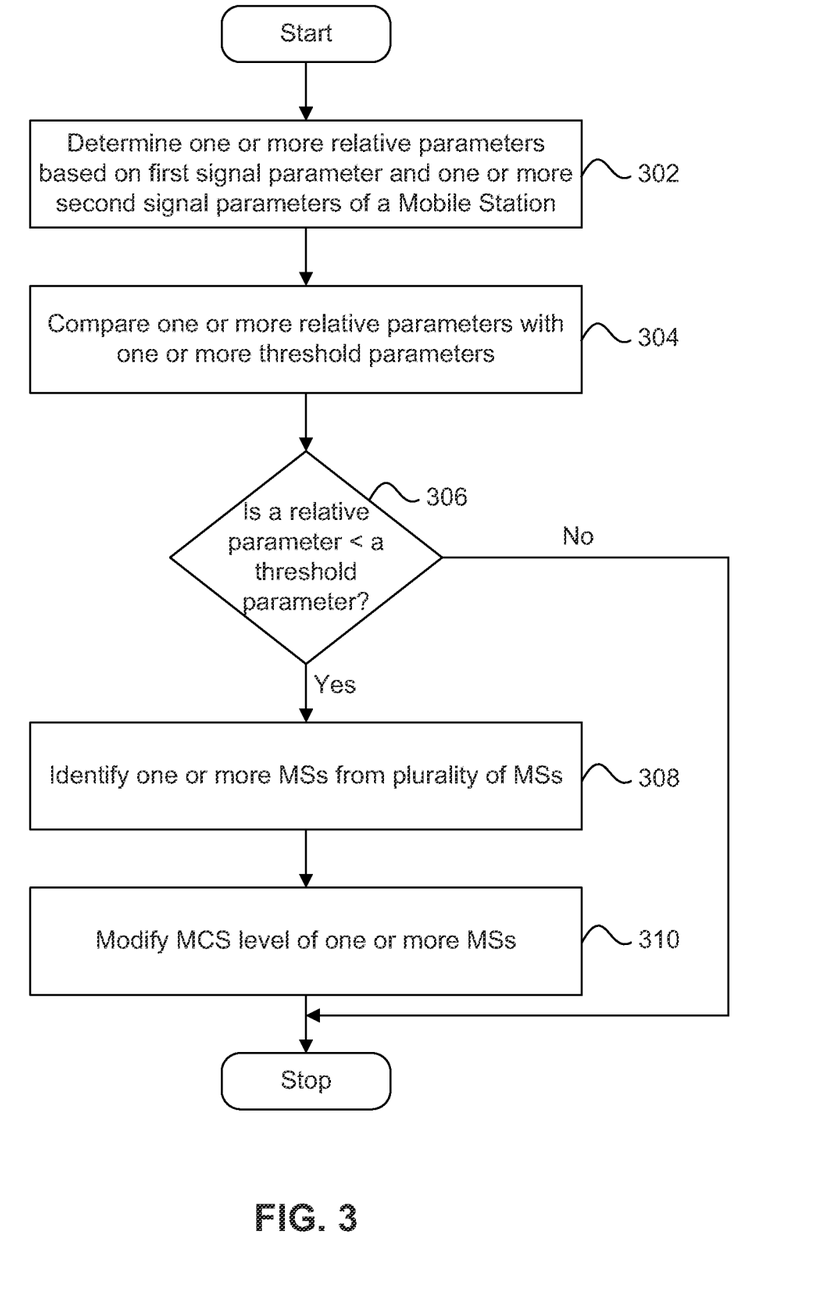
FIG. 3 is a flow chart illustrating a method for managing uplink communication in the wireless communication network, in accordance with another embodiment of the invention.

FIG. 3 is a flow chart illustrating a method of managing uplink communication in wireless communication network 100, in accordance with another embodiment of the invention. In this method, relative signal parameters associated with the plurality of MSs are determined from a first signal parameter and one or more second signal parameters. Then, a MCS level is modified based on the relative signal parameters and one or more threshold parameters. At step 302, one or more relative signal parameters are determined based on the first signal parameter and the one or more second signal parameters. The one or more relative signal parameters associated with each MS of the plurality of MSs are determined in wireless communication network 100. A relative signal parameter of the one or more relative signal parameters may indicate a measure of an interference caused at a MS. The interference caused at the MS may be based on a signal transmitted between a serving BS and the MS and a signal transmitted between a neighboring BS and the MS. The neighboring BS is one of the one or more BSs neighboring to the MS. Determining the relative signal parameters facilitates in identifying one or more MSs that cause higher measure of interference in wireless communication network 100. The interference may include an inter cell interference and an intra cell interference.

In an embodiment of the invention, a relative signal parameter of the one or more relative signal parameters may be determined by computing a difference of the first signal parameter and a second signal parameter of the one or more second signal parameters. For example, if a first signal parameter is a gain between a MS and a serving BS of the MS and a second signal parameter of the one or more second signal parameters is a gain between the MS and a BS neighboring to the MS, the relative signal parameter may be expressed as:

$$\text{Relative Signal Parameter} = G_{ij} - G_{ik} \quad (1)$$

Here in Equation 1:

$G_{ij}$ is a gain between i-th MS and j-th BS serving the i-th MS; and $G_{ik}$ is a gain between i-th MS and k-th BS neighboring to the i-th MS Upon determining the one or more relative signal parameters, one or more relative signal parameters associated with a MS of the plurality of MSs are compared with a threshold parameter of the one or more threshold parameters at step 304. Similarly, the one or more relative signal parameters associated with each MS of the plurality of MSs is compared with the one or more threshold parameters. In an embodiment of the invention, the one or more relative signal parameters associated with each MS of the plurality of MSs may be compared with a different threshold parameter of the one or more threshold parameters. Alternatively, the one or more relative signal parameters associated with each MS of the plurality of MSs may be compared with a single threshold parameter. In another embodiment, a relative signal parameter of the one or more relative signal parameters is compared with the one or more threshold parameters. Based on the comparison, a predefined range corresponding to the one or more threshold parameters in which the relative signal parameter may fall, is identified. These relative signal parameters falling within the predefined range are of the one or more relative signal parameters.

Based on the comparison, a check is performed to identify whether the one or more relative signal parameters associated with the MS are lower than the threshold parameter of the one or more threshold parameters at step 306. If the one or more relative signal parameters are identified as lower than the threshold parameter then step 308 is performed.

At step 308, one or more MSs are identified from the plurality of MSs. The one or more relative signal parameters of a MS of the one or more MSs are lower than a threshold parameter of the one or more threshold parameters. Therefore, the measure of interferences caused by the one or more MSs may be higher than measure of interferences caused by one or more MSs that are not identified from the plurality of MSs. The one or more MSs that are not identified from the plurality of MSs may have their relative signal parameters greater than the one or more threshold parameters.

As an example of the steps given above, in wireless communication network 100, BS 102 serves MS 108 and MS 110. BS 102 receives a first gain of 20 db as a first signal parameter from MS 108 based on strength of a signal transmitted between MS 108 and BS 102. BS 102 further receives a second gain of 15 db as a second signal parameter based on strength of a signal transmitted between MS 108 and BS 104 neighboring to MS 108. Similarly, BS 102 receives a first gain of 25 db from MS 110 as a first signal parameter based on strength of a signal transmitted between MS 110 and BS 102. Further, BS 102 receives a second gain of 23 db as a second signal parameter based on strength of a signal transmitted between MS 110 and BS 104 neighboring to MS 110.

Then relative signal parameters for MS 108 and MS 110 are determined based on the first gains and the second gains of MS 108 and MS 110. A relative signal parameter is a difference of a first gain and a second gain. Thus, the relative signal parameters of MS 108 and MS 110 are 5 db and 2 db respectively. The relative signal parameters of MS 108 and MS 110 are then compared with a threshold parameter, such as, 3 db. In this case, the relative signal parameter of MS 108 is identified as greater than the threshold parameter. Further, the relative signal parameter of MS 110 is identified as lesser than the threshold parameter.

Alternatively, the relative signal parameters of MS 108 and MS 110 may be compared with threshold parameters, such as, 4 db and 3 db. Based on the comparison, the relative signal parameter of MS 110 is identified as lower than the threshold parameter such as, 3 db and the relative signal parameter of MS 108 is identified as higher than the threshold parameter such as, 4 db.

Referring back to step 308, once the one or more MSs are identified from the plurality of MSs, then MCS levels of the one or more MSs is modified at step 310. In an embodiment of the present invention, modification of a MCS level may include selecting a lower MCS level from a set of available MCS levels for a MS of the one or more MSs. The set of available MCS levels for the MS may be obtained by limiting the number of MCS levels present in a predefined set of MCS levels initially available for the MS. By limiting the number of MCS levels, selection of a highest available MCS level is avoided for a MS. For example, initially a predefined set of MCS levels available for a MS is {1, 2, 3, 4, 5} and a MCS level of the MS is 5. Then during modification of a MCS level of the MS the predefined set of MCS levels for the MS is limited to {1, 2, 3, 4} i.e., a set of available MCS levels. Thus the MCS level of the MS is modified to any of the MCS level of the set of available MCS levels other than a MCS level of '5'. Similarly, if a predefined set of MCS levels for the MS is {1, 2, 3, 4} and a MCS level of the MS is 4, the set of available MCS levels for the MS is limited to {1, 2, 3}, by avoiding selection of MCS level '4'. By limiting the predefined set of available MCS levels coverage of the MS in a cell of wireless communication network 100 is improved. Further, modification of the MCS level based on the limited set of available MCS levels enables lowering of a MCS level of each of the one or more MSs.

Further, MCS levels of one or more MSs that are not identified from the plurality of MSs may be modified by selecting MCS levels from a predefined set of MCS levels available to each MS of these one or more MSs. For example, a predefined set of MCS levels available for a MS not identified from the plurality of MSs is {1, 2, 3, 4, 5} and a MCS level of the MS is 4. Then the MCS level of the MS may be modified to any of the MCS level of the predefined set of MCS levels. Thus, in this case the predefined set of MCS levels available to the MS may not be limited.

In another embodiment of the invention, modification of the MCS level of the one or more MSs may include lowering the MCS level by a predefined level. The predefined level may be a fixed level for lowering the MCS level. The predefined level may be determined based on a communication parameter associated with a MS of the one or more MSs. The communication parameter may be a SINR value. In another scenario, the predefined level may be determined based on the one or more threshold parameters. For example, if a predefined level is 2, a MCS level of a MS will be lowered by two positions. Therefore, if MCS level of the MS is 5, then MCS level is lowered to 3. Similarly, a MCS level of each of the one or more MSs may be lowered by the predefined level.

Alternatively, modification of the MCS level may include lowering the MCS level of the one or more MSs by one or more different predefined levels. For example, a MCS level of the one or more MSs may be lowered by predefined levels of 2 and 1. In this case, a MCS level of 5 associated with a MS of the one or more MSs is lowered by the predefined level of 2 to obtain an MCS level of 3. Whereas, a MCS level of 5 associated with another MS of the one or more MSs is lowered by the predefine level of 1 to obtain an MCS level of 4.

In yet another embodiment of the invention, modification of the MCS level of the one or more MSs may include, selecting a MCS level based on a mathematical function F(k). The mathematical function F(k) provides an MCS level to be selected for each MS of the one or more MSs. Alternately, F(k) provides a predefined level for lowering the MCS level each MS of the one or more MSs. The mathematical function F(k) is expressed as:

$$F(k) = m - \min(k, m-1) \quad (2)$$

Where in Equation 2:

$$k = \text{floor}\left(\frac{Gij - Gik}{n}\right) \quad (3)$$

In Equation 2 and Equation 3:

m is an Integer, such that, number of MCS levels in a predefined set of MCS levels available for a MS>m=2;

n is a positive integer;

Gij is a gain between an i-th MS and a j-th BS serving the i-th MS; and

Gik is a gain between the i-th MS and a k-th BS neighboring to the i-th MS

In still another embodiment of the invention, modification of the MCS level of the one or more MSs may include lowering a MCS level associated with each MS of the one or more MSs to a lowest permitted MCS level. The MCS level associated with an uplink of each MS of the one or more MSs is lowered. The lowest permitted MCS level corresponding to each MS of the one or more MSs may be identified based on a communication parameter associated with each MS of the one or more MSs.

The above method enables lowering MCS level of one or more MSs in an adaptive manner based on interference caused at each MS of the one or more MSs in wireless communication network 100. Thus, a balance between power control and MCS level modification associated with the one or more MSs is maintained and a maximum throughput is achieved for each MS of the one or more MSs.

Figure 4:
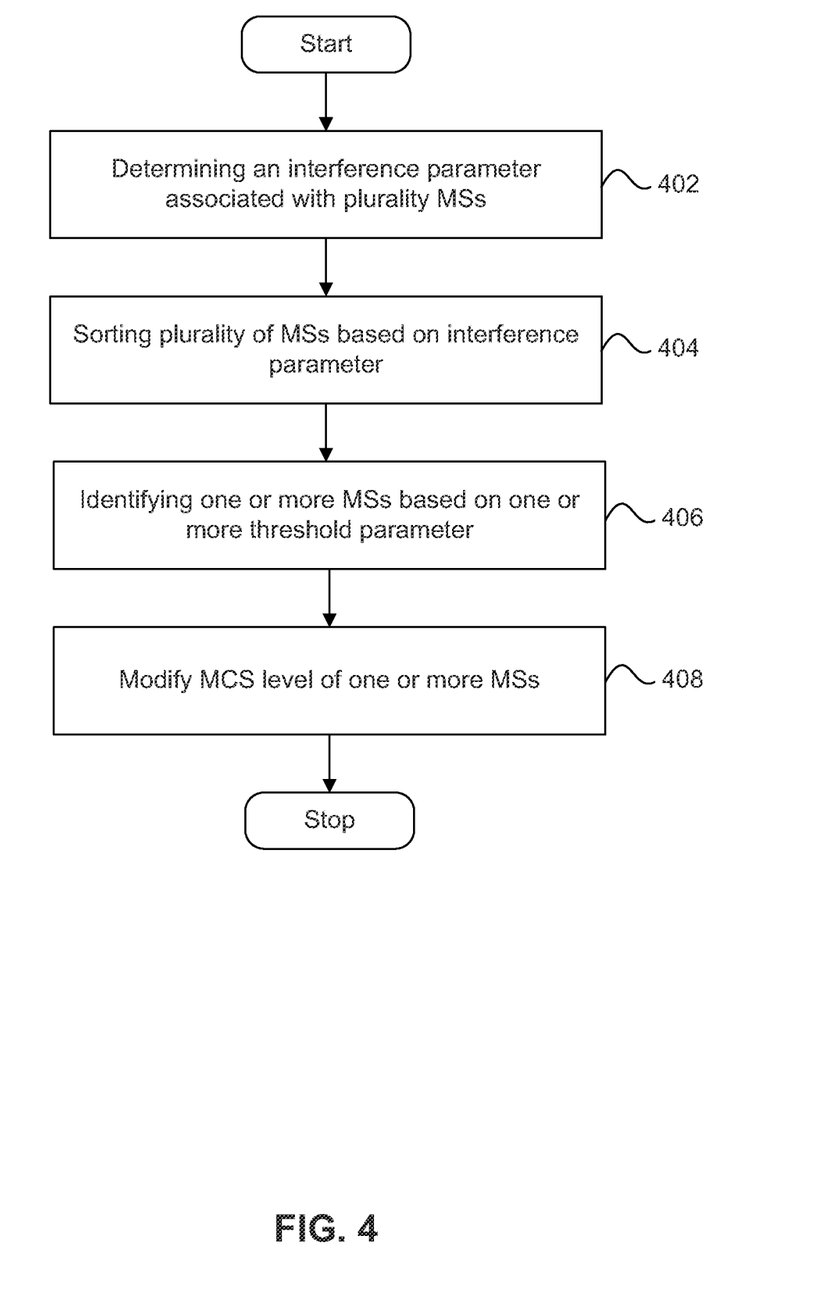
FIG. 4 is a flow chart illustrating a method for managing uplink communication in the wireless communication network, in accordance with yet another embodiment of the invention.

FIG. 4 is a flow chart illustrating a method for managing communication in wireless communication network 100, in accordance with yet another embodiment of the invention. In this method, interference parameters associated with the plurality of MSs are determined from a first signal parameter and one or more second signal parameters. Then, MCS levels associated with one or more MSs identified from the plurality of MSs based on the interference parameters and one or more threshold parameters are modified.

At step 402, an interference parameter associated with each MS of the plurality of MSs in wireless communication network 100 is determined. The interference parameter may be a measure of interference caused at a MS by one or more BSs neighboring to the MS. An interference parameter associated with a MS of the plurality of MSs is determined based on a first signal parameter and one or more second signal parameters corresponding to the MS. Alternatively, the interference parameter may be determined based on the first signal parameter and a summation of the one or more second signal parameters. Thus by determining the interference parameter, MSs contributing higher measure of interference in wireless communication network 100 may be identified.

The interference parameter may be determined by combining the first signal parameter and the one or more second signal parameters. In an embodiment of the invention, the interference parameter may be a function of the first signal parameter and the one or more second signal parameters. For example, a first signal parameter is a transmitted power of a MS corresponding to a serving BS of the MS of the plurality of MSs and one or more second signal parameters are one or more gains corresponding to one or more BSs neighboring to the MS. Then the interference parameter may be expressed as:

$$Xi(t) = \Sigma_k (Pi \times Gik) \quad (4)$$

$$li(t) = \mu Xi(t) + (1-\mu) \times li(t-1) \quad (5)$$

Here in Equation 4 and Equation 5:

$Xi(t)$ is a time based intermediate function associated with an i-th MS;

$Pi$ is a transmitted power of the i-th MS corresponding to a j-th BS serving the i-th MS;

$Gik$ is a gain between the i-th MS and a k-th BS neighboring to the i-th MS, $k \neq j$;

$li(t)$ is the interference parameter associated with the i-th MS; and $\mu$ is IIR filter based constant.

Upon determining the interference parameters of the plurality of MSs, sorting of the plurality of MSs is performed at step 404. The plurality of MSs may be sorted based on the interference parameter associated with each MS of the plurality of MSs. Initially, interference parameters of each MS of the plurality of MSs may be compared amongst each other. Then, plurality of MSs may be sorted based on this comparison.

Thereafter, at step 406, one or more MSs are identified from the plurality of MSs based on one or more threshold parameters. The one or more MSs are identified from the plurality of MSs that are sorted. A threshold parameter of the one or more threshold parameters may be a predefined percentage of MSs. Alternatively, the threshold parameter of the one or more threshold parameters may be a predefined count of MSs i.e. a predefine number of MSs. In an embodiment of the invention, the one or more MSs may be identified based on a single threshold parameter. For example, if a threshold parameter is 20%, then top 20% MSs of the plurality of MSs that are sorted are identified as the one or more MSs. An interference parameter corresponding to each of the one or more MSs is greater than an interference parameter corresponding to each of one or more MSs precluded from being identified from the plurality of MSs.

In another embodiment of the invention, the one or more MSs are identified based on multiple threshold parameters. For example, one or more MSs are identified from a plurality of MSs based on threshold parameters, such as, 20% and 10%. A first set of MSs of the one or more MSs corresponds to top 20% MSs of the plurality of MSs. Whereas, a second set of MSs of the plurality of MSs corresponds to top 10% MSs of MSs remaining in the plurality of MSs after the identification of first set of MSs. Therefore, an interference parameter corresponding to each MS of the first set is greater than an interference parameter corresponding to each MS of the second set. Further, an interference parameter corresponding to each MS of the one or more MSs is greater than an interference parameter corresponding to each of one or more MSs precluded from being identified from the plurality of MSs.

In a variant embodiment of the invention, step 404 may be performed by comparing the interference parameter associated with each MS of the plurality of MSs with the one or more threshold parameters. In this case, a threshold parameter of the one or more threshold parameters may indicate a value associated with a maximum interference allowable in wireless communication network 100. In an embodiment of the invention, the interference parameter associated with each MS of the plurality of MSs may be compared with a different threshold parameter of the one or more threshold parameters. Alternatively, interference parameters associated with a set of MSs of the plurality of MSs may be compared with a threshold parameter of the one or more threshold parameters. Based on the comparison, the one or more MSs with interference parameter greater than the one or more threshold parameters are identified from the plurality of MSs. Once the one or more MSs are identified, then MCS levels of the one or more MSs are modified at step 408. This has been explained in detail in FIG. 3.

As an example of the steps given above, in wireless communication network 100, BS 102 serves MS 108 and MS 110. BS 102 receives a first signal parameter based on strength of a signal transmitted between MS 108 and BS 102, from MS 108. The first signal parameter is a transmitted power. BS 102 further receives a second signal parameter based on strength of a signal transmitted between MS 108 and BS 104 neighboring to MS 108. The second signal parameter is a gain. Similarly, BS 102 receives a first signal parameter based on strength of a signal transmitted between MS 110 and BS 102, from MS 110. This first signal parameter is a transmitted power. BS 102 further receives a second signal parameter based on strength of a signal transmitted between MS 110 and BS 104 that is neighboring to MS 110. The second signal parameter is a gain. In the same manner, BS 104 serving MS 112, receives a transmitted power and a gain corresponding to MS 112. Further, BS 106 serving MS 114 and MS 116, receives a transmitted power and a gain corresponding to each of MS 114 and MS 116.

BS 102, BS 104 and BS 106 may be controlled by a Base Station Controller (BSC) (Not shown in FIG. 1) in wireless communication network 100. The BSC receives the transmitted power and the gains corresponding to each MS of plurality of MSs being served by BS 102, BS 104 and BS 106 in wireless communication network 100. Thereafter, interference parameters for each MS of the plurality of MSs are determined based on the transmitted power and the gain of the each MS. The interference parameters are determined by utilizing equation 4 and equation 5 described above. Thus, the interference parameters corresponding to MS 108, MS 110, MS 112, MS 114, and MS 116 as determined. The plurality of MSs are then sorted in decreasing order of corresponding interference parameters. One or more MSs are identified from the plurality of MSs based on the interference parameters and a threshold parameter for modifying MCS levels of the one or more MSs. If the threshold parameter in wireless communication network 100 is 30%, top 30% MSs with higher interference parameters are identified. Thus, if the plurality of MSs are sorted in the following manner such as, MS 110>MS 116>MS 108>MS 112>MS 114, then MS 110 and MS 116 are identified for modifying MCS level. Thereafter, MCS levels of MS 110 and MS 116 are modified.

Figure 5:
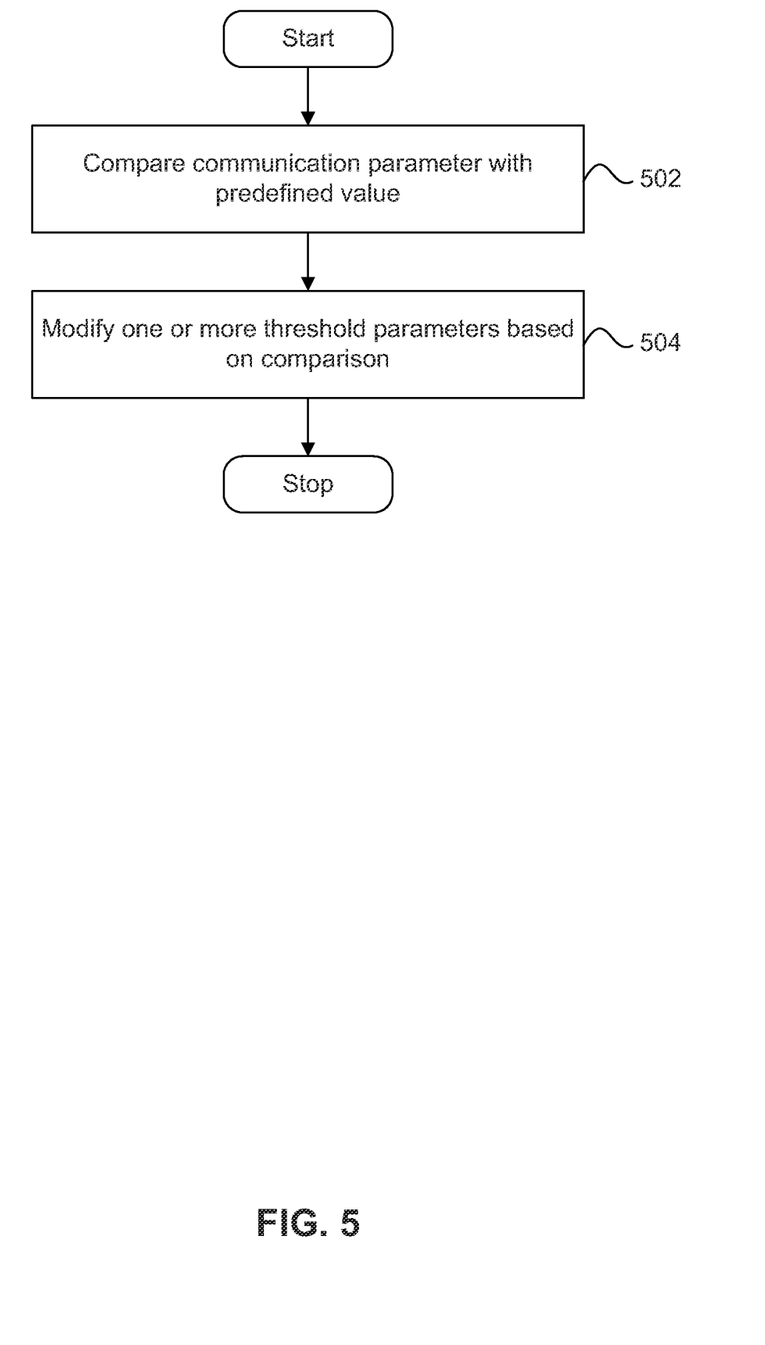
FIG. 5 is a flow chart illustrating a method for managing one or more threshold parameters in the wireless communication network, in accordance with an embodiment of the invention.

FIG. 5 is a flow chart illustrating a method for managing the one or more threshold parameters in wireless communication network 100, in accordance with an embodiment of the invention. The one or more threshold parameters are associated with communication parameters of wireless network 100. In an embodiment of the invention, a communication parameter may correspond to a coverage or a transmission error rate associated with a MS of the plurality of MSs. The transmission error rate may be a block error rate (BLER). The communication parameter is checked over a large number of frames transmitted in wireless communication network 100. Then communication parameter is compared with a predefined value and accordingly the one or more threshold parameters are modified.

The method involves comparing the communication parameter with a predefined value at step 502. The communication parameter may be a coverage in wireless communication network 100. The predefined value denotes a minimum coverage that is required for the MS for enabling efficient communication in wireless communication network 100. The predefined value associated with the communication parameter may dynamically change based on time and frequency band utilization in wireless communication 100. Thereafter, based on the comparison a check is performed to identify whether the communication parameter is lower than or higher than the predefined value.

Then, the one or more threshold parameters are modified at step 504. Based on the comparison, if the communication parameter is lower than the predefined value, each of the one or more threshold parameters are modified by a predefined level. In an embodiment of the invention, one or more predefined levels may be utilized for modifying the one or more threshold parameters. The one or more threshold parameters are explained in detail in conjunction with FIG. 4. For example, a communication parameter is a coverage in wireless communication network 100. Further, a threshold parameter indicates a percentage of MS such as 20%. Then, it is determined when the coverage is lower than a predefined value. The predefined value indicates a required coverage in wireless communication network 100. If the communication parameter is lower than the predefined value, threshold parameter is increased by the predefined value of 5%. Thus, the threshold parameter is modified to obtain 25% as the threshold parameter.

However, if the communication parameter is greater than the predefine value, the threshold parameter of 20% is decreased by the predefined value to obtain 15% as the modified threshold parameter.

The above method enables optimization of the one or more threshold parameters based on changes in uplink characteristics and requirements in wireless communication network 100. As the one or more threshold parameters are optimized, selection of one or more MSs for lowering MCS levels is also optimized.

Figure 6:
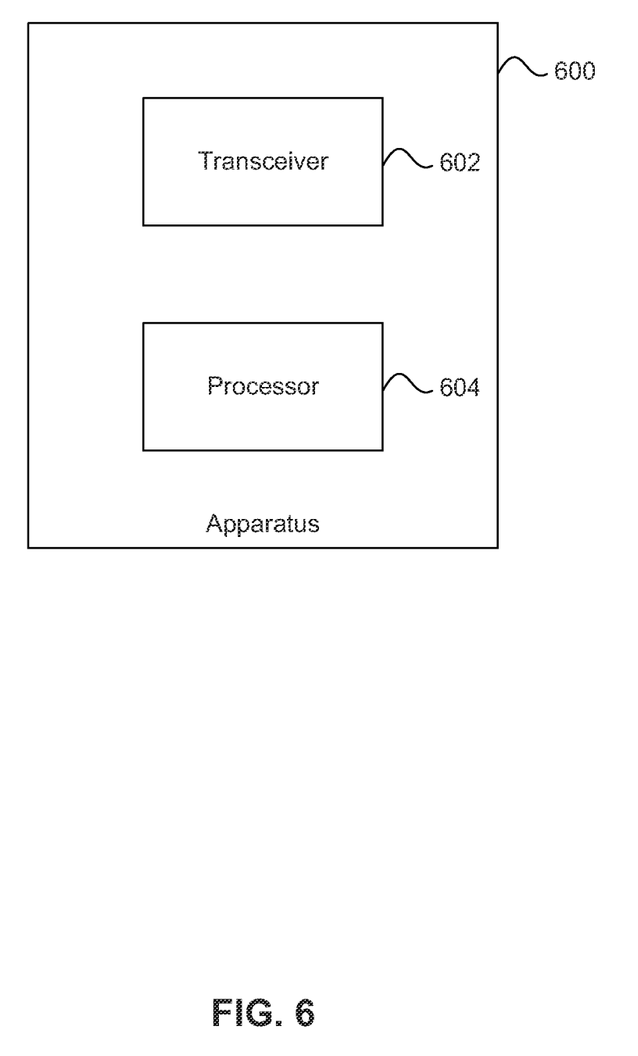
FIG. 6 is a block diagram illustrating an apparatus for managing uplink communication in the wireless communication network, in accordance with an embodiment of the invention.

FIG. 6 is a block diagram illustrating an apparatus 600 for managing uplink communication in wireless communication network 100, in accordance with an embodiment of the invention. Apparatus 600 includes a transceiver 602 and a processor 604. Apparatus 600 may be a BS managing communication with MSs served by the BS. In another embodiment, apparatus 600 may be a BSC. Alternatively, apparatus 600 may be any other network entity in wireless communication network 100. Transceiver 602 receives a first signal parameter corresponding to each MS of the plurality of MSs.

When apparatus 600 is a serving BS, transceiver 602 receives a message including the first signal parameter from a MS served by the serving BS. The first signal parameter received from the MS is associated with a strength of a signal transmitted between the serving BS and the MS. In an embodiment of the invention, transceiver 602 may receive one or more messages including one or more first signal parameters corresponding to the plurality of MSs. Alternatively, transceiver 602 may receive the one or more message together in the form of a periodic report circulated in wireless communication network 100.

Further, transceiver 602 receives one or more second signal parameters corresponding to each MS of the plurality of MSs. When apparatus 600 is a serving BS, transceiver 602 receives one or more messages including the one or more second signal parameters from a MS being served by the serving BS. The one or more second signal parameters received from the MS are associated with one or more BSs neighboring to the MS. In an embodiment of the invention, transceiver 602 may receive one or more messages including the first signal parameter and the one or more second signal parameters corresponding to each MS of the plurality of MSs. The first signal parameter and the one or more second signal parameters are explained in detail in conjunction with FIG. 2.

Processor 604 receives the first signal parameter and the one or more second signal parameters from transceiver 602. Thereafter, processor 604 selects one or more MSs from the plurality of MSs based on the first signal parameter, the one or more second signal parameters and one or more threshold parameters. A threshold parameter of the one or more threshold parameter is associated with a communication parameter. The one or more threshold parameters and the communication parameter are explained in conjunction with FIG. 2.

In one scenario, to select the one or more MSs from the plurality of MSs, processor 604 determines one or more relative signal parameters associated with each MS of the plurality of MSs. The one or more relative signal parameters are determined based on the first signal parameter and the one or more second signal parameters. Thereafter, processor 604 compares one or more relative signal parameters associated with a MS of the plurality of MSs with a threshold parameter of the one or more threshold parameters as explained in conjunction with FIG. 3.

Based on the comparison, processor 604 identifies the one or more MSs. One or more relative signal parameters associated with each MS of the one or more MSs is lower than a threshold parameter of the one or more threshold parameters.

In another scenario, to select the one or more MSs from the plurality of MSs, processor 604 determines an interference parameter associated with each MS of the plurality of MSs. The interference parameter is determined based on the first signal parameter and one or more second signal parameters as explained in conjunction with FIG. 4. Processor 604 then sorts the plurality of MSs based on an interference parameter associated with each MS of the plurality of MSs. Subsequent to sorting of the plurality of MSs, processor 604 identifies the one or more MSs from the plurality of sorted MSs based on one or more threshold parameters. A threshold parameter of the one or more threshold parameters may correspond to a predefined percentage of MSs. Thus, the one or more MSs may be identified by selecting a predefined percentage of MSs with highest interference parameters from the plurality of MSs that are sorted. An interference parameter associated with each MS of the one or more MSs is greater than an interference parameter corresponding to each MS of one or more MSs precluded from being selected from the plurality of MSs. This is explained in detail in conjunction with FIG. 4.

Alternatively, processor 604 may compare the interference parameter associated with each MS of the plurality of MSs with one or more threshold parameters. Thereafter, processor 604 identifies the one or more MSs from the plurality of MSs based on the comparison. This is explained in detail in conjunction with FIG. 4.

Once the one or more MSs are identified, processor 604 modifies MCS level of the one or more MSs as explained in FIG. 3. In an embodiment of the invention, processor 604 identifies a new MCS level for each MS of the one or more MSs and instructs the one or more MSs to implement the modified MCS level. Processor 604 instructs a MS to modify a MCS level by sending a message including a new MCS level. Processor 604 sends instructions to the MS through transceiver 602. Similarly, processor 604 may send instructions to each MS of the one or more MSs through transceiver 602.

Figure 7:
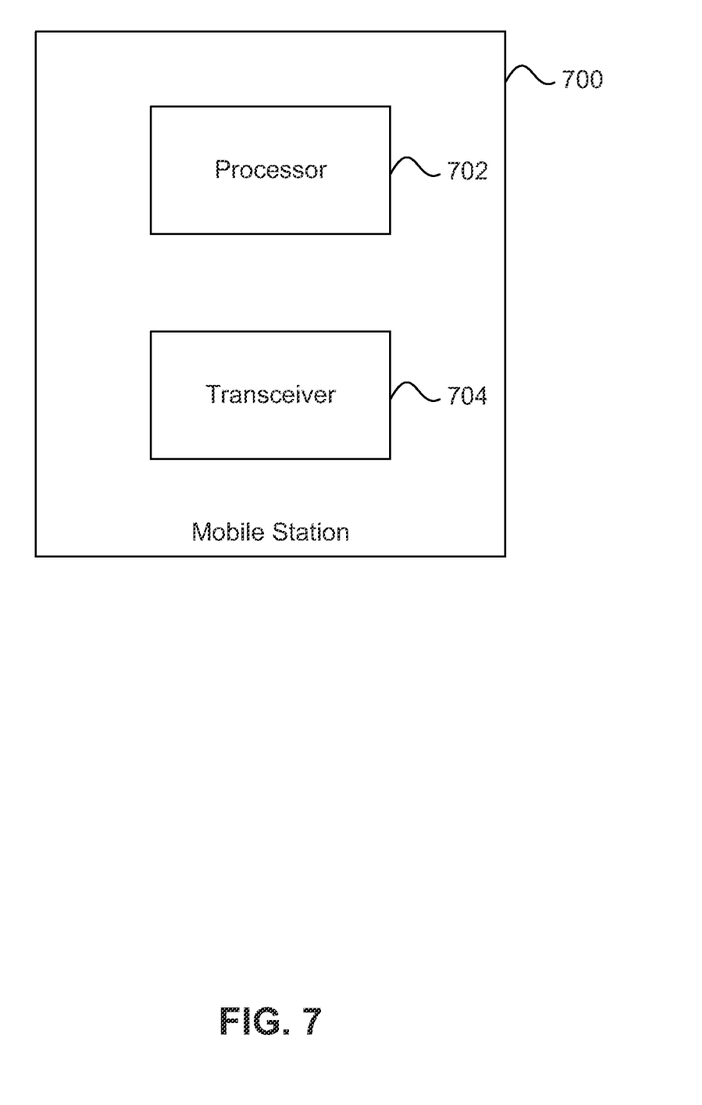
FIG. 7 is a block diagram illustrating a mobile station (MS) for managing uplink communication in the wireless communication network, in accordance with an embodiment of the invention.

FIG. 7 is a block diagram illustrating MS 700 for managing Modulation and Coding Scheme (MCS) level in wireless communication network 100, in accordance with an embodiment of the invention. MS 700 includes a processor 702 and a transceiver 704. MS 700 is a MS of the plurality of MSs in wireless communication network. Processor 702 enables identification of a requirement for modifying MCS level of MS 700.

Processor 702 utilizes a first signal parameter and one or more second signal parameters corresponding to MS 700 for identifying the requirement for MCS level modification. Processor 702 may determine the first signal parameter based on strength of a signal transmitted between MS 700 and a serving BS of MS 700. Similarly, processor 702 may determine the one or more second signal parameters based on strength of a signal transmitted between MS 700 and one or more BSs neighboring to MS 700. Alternatively, the serving BS of MS 700 may determine the first signal parameter and the one or more second signal parameters and send a message to MS 700 including the first signal parameter and the one or more second signal parameters. Processor 702 identifies the requirement for modification of MCS level by comparing the first signal parameter and the one or more second signal parameters with one or more threshold parameters. A threshold parameter of the one or more threshold parameters is associated with a communication parameter. The one or more threshold parameters and the communication parameter are explained in conjunction with FIG. 2.

In one scenario, for identifying the requirement of the modification of the MCS level, processor 702 determines a one or more relative signal parameters associated with MS 700 based on the first signal parameter and the one or more second signal parameters. Thereafter, processor 702 compares the one or more relative signal parameters with the one or more threshold parameters as explained in FIG. 3. Based on the comparison if a relative signal parameter of the one or more relative signal parameters is identified as lower than a threshold parameter of the one or more threshold parameters, then processor 702 identifies the requirement for modifying the MCS level of MS 700.

In another scenario, for identifying the requirement of the modification of the MCS level, processor 702 determines an interference parameter corresponding to MS 700 based on the first signal parameter and the one or more second signal parameters. Thereafter, processor 702 compares the interference parameter with the one or more threshold parameters as explained in FIG. 4. Based on the comparison if the interference parameter is identified as greater than a threshold parameter of the one or more threshold parameters, then processor 702 detects the requirement for modifying the MCS level of MS 700.

Processor 702 provides the requirement for modifying the MCS level to transceiver 704. Transceiver 704 sends a request for modifying the MCS level of MS 700 to the serving BS. The request includes a requirement for modification of the MCS level. In an embodiment of the invention, processor 702 identifies an MCS level for MS 700 as explained in conjunction with FIG. 3. The MCS level identified may be based on the one or more threshold parameters. Thus, transceiver 704 sends a request including the MCS level to the serving BS of MS 700. The serving BS decides a MCS level and accordingly instructs MS 700. The MCS level decided by the serving BS may be sent as a request to MS 700. Transceiver 704 receives the request including the decided MCS level. Thereafter, processor 702 changes the MCS level of MS 700 to the decided MCS level based on the request.

Various embodiments of the invention provide a method and apparatus for managing uplink communication in wireless communication network by enabling selective modification of the Modulation and Coding Scheme (MCS) level of various mobile stations (MS) in the wireless communication network. The method involves individually considering an interference in uplink generated by the MSs in the wireless communication network. Based on the interference caused by the MSs, the MSs with highest interference are selected and MCS levels of only these selected MSs are reduced. Thus, modification of the MCS level is performed in an adaptive manner. Further, since the interference in the wireless communication network is under control an MS transmits only adequate amount power to maintain the communication link. Thus, there is no wastage of power resulting in improved battery life of the MS. Moreover, as a relative interference caused by a MS based on a serving BS and BSs corresponding to an active set of the MS is taken into consideration, both inter-cell and intra-cell interference are considered. Due to reduced interference, the coverage associated with the wireless communication network is also improved and controlled. Therefore, even a weaker MS can enter the wireless communication network with ease. Moreover, the MS need not perform additional messaging or handshaking activities to obtain additional throughput and coverage.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the dependency of this application and all equivalents of those claims as issued.

What is claimed is:

1. A method for a mobile station for managing communication in a wireless communication network, comprising:
   determining a first signal parameter associated with a communication link between the mobile station and a serving base station;
   determining a second signal parameter associated with a communication link between the mobile station and a neighboring base station;
   determining a relative signal parameter for the mobile station using the first signal parameter and the second signal parameter;
   comparing the relative signal parameter for the mobile station with a threshold parameter; and
   when the relative signal parameter falls within a predefined range of the threshold parameter, sending a request for modifying a Modulation and Coding Scheme (MCS) level of the mobile station to the serving base station.

2. The method of claim 1, further comprising:
   receiving a decided MCS level; and
   changing the MCS level of the mobile station to the decided MCS level.

3. The method of claim 1, further comprising:
   identifying the MCS level of the mobile station, wherein the request for modifying the MCS level of the mobile station includes the MCS level identified.

4. The method of claim 1, wherein the first signal parameter is at least one of: a path loss, a shadowing parameter, an antenna gain, a fading parameter, a signal strength indicator, or a channel quality.

5. The method of claim 1, wherein the second signal parameter corresponds to at least one of: a path loss, a shadowing parameter, an antenna gain, a fading parameter, a signal strength indicator, or a channel quality between the mobile station and the neighboring base station.

6. The method of claim 1, further comprising:
   comparing a communication parameter with a predefined value; and
   modifying the threshold parameter based on the comparison.

7. The method of claim 6, wherein the communication parameter includes one of: a Carrier to Interference and Noise Ratio (CINR), a Physical CINR (PCINR), an Effective CINR (ECINR), a Carrier to Interference Ratio (CIR), a Signal to Interference and Noise Ratio (SINR), a Signal to Interference Ratio (SIR), a coverage parameter, a Bit Error Rate (BER), a Block Error Rate (BLER), and an Outer Loop Correction (OLC) Factor.

8. The method of claim 1, wherein determining the relative signal parameter comprises computing a difference between the first signal parameter and the second signal parameter.

9. A mobile station for managing communication in a wireless communication network, comprising:
   a transceiver; and
   a processor;
   wherein the processor is configured to:
      determine a first signal parameter associated with a communication link between the mobile station and a serving base station;
      determine a second signal parameter associated with a communication link between the mobile station and a neighboring base station;
      determine a relative signal parameter for the mobile station using the first signal parameter and the second signal parameter;
      compare the relative signal parameter for the mobile station with a threshold parameter; and
      when the relative signal parameter falls within a predefined range of the threshold parameter, provide a requirement for modifying a Modulation and Coding, Scheme (MCS) level of the mobile station to the transceiver; and
   wherein the transceiver is configured to send a request for modifying the MCS level of the mobile station to the serving base station.

10. The mobile station of claim 9, wherein:
    the transceiver is further configured to receive a decided MCS level; and
    the processor is further configured to change the MCS level of the mobile station to the decided MCS level.

11. The mobile station of claim 9, wherein:
    the processor is further configured to identify the MCS level of the mobile station, and wherein the request for modifying the MCS level of the mobile station includes the MCS level identified.

12. The mobile station of claim 9, wherein the first signal parameter is at least one of: a path loss, a shadowing parameter, an antenna gain, a fading parameter, a signal strength indicator, or a channel quality.

13. The mobile station of claim 9, wherein the second signal parameter corresponds to at least one of: a path loss, a shadowing parameter, an antenna gain, a fading parameter, a signal strength indicator, or a channel quality between the mobile station and the neighboring base station.

14. The mobile station of claim 9, wherein the processor is further configured to:
    compare a communication parameter with a predefined value; and
    modify the threshold parameter based on the comparison.

15. The mobile station of claim 14, wherein the communication parameter includes one of: a Carrier to Interference and Noise Ratio (CINR), a Physical CINR (PCINR), an Effective CINR (ECINR), a Carrier to Interference Ratio (CIR), a Signal to Interference and Noise Ratio (SINR), a Signal to Interference Ratio (SIR), a coverage parameter, a Bit Error Rate (BER), a Block Error Rate (BLER), and an Outer Loop Correction (OLC) Factor.

16. The mobile station of claim 9, wherein the processor is further configured to compute a difference between the first signal parameter and the second signal parameter to determine the relative signal parameter.

17. A method for managing communication in a wireless communication network comprising:
    determining a first signal parameter comprising a transmitted power corresponding to a serving base station;
    determining a second signal parameter comprising at least one of: a path loss, a shadowing parameter, an antenna gain, a fading parameter, a signal strength indicator, and a channel quality between a mobile station and a neighboring base station;
    determining an interference parameter for the mobile station using the first signal parameter and the second signal parameter;
    comparing the interference parameter for the mobile station with a threshold parameter; and
    based on the comparison, sending a request for modifying a Modulation and Coding Scheme (MCS) level of the mobile station to the serving base station.

18. The method of claim 17, further comprising:
    receiving a decided MCS level; and
    changing the MCS level of the mobile station to the decided MCS level.

19. The method of claim 17, further comprising:
identifying the MCS level of the mobile station, wherein the request for
modifying the MCS level of the mobile station includes the MCS level identified.

20. The method of claim 17, further comprising:
comparing a communication parameter with a predefined value; and
modifying the threshold parameter based on the comparison.

* * * * *